United States Patent
Kim et al.

(10) Patent No.: US 10,288,247 B2
(45) Date of Patent: May 14, 2019

(54) AUTOMOTIVE HOLOGRAM IMAGE PRODUCING LAMP

(71) Applicant: SL Corporation, Daegu (KR)

(72) Inventors: Jiyeon Kim, Gyeongsanbu-do (KR); Myong Guan Jeong, Gyeongsanbu-do (KR); Jinyoung Kim, Gyeongsanbu-do (KR); Jin Ho Jo, Gyeongsanbu-do (KR)

(73) Assignee: SL Corporation, Daegu (KR)

( * ) Notice: Subject to any disclaimer, the term of this patent is extended or adjusted under 35 U.S.C. 154(b) by 10 days.

(21) Appl. No.: 15/375,807

(22) Filed: Dec. 12, 2016

(65) Prior Publication Data

US 2017/0184270 A1    Jun. 29, 2017

(30) Foreign Application Priority Data

Dec. 29, 2015  (KR) .......................... 10-2015-0188243

(51) Int. Cl.
| | |
|---|---|
| *G03H 1/00* | (2006.01) |
| *G03H 1/22* | (2006.01) |
| *G03H 1/26* | (2006.01) |
| *F21S 43/00* | (2018.01) |
| *F21S 45/00* | (2018.01) |

(52) U.S. Cl.
CPC ............... *F21S 43/00* (2018.01); *F21S 45/00* (2018.01); *G03H 1/2249* (2013.01); *G03H 1/2202* (2013.01); *G03H 1/265* (2013.01); *G03H 2001/0055* (2013.01); *G03H 2001/2228* (2013.01); *G03H 2001/2231* (2013.01); *G03H 2001/2234* (2013.01)

(58) Field of Classification Search
CPC .......... G02B 5/20; G02B 7/006; G03B 11/00; G03B 17/565; G03B 9/02; G03B 11/04; G03B 17/14; G03B 17/566; G03B 5/00; G03B 7/18
USPC ......................................... 359/892, 889, 885
See application file for complete search history.

(56) References Cited

U.S. PATENT DOCUMENTS

2010/0302794 A1* 12/2010  Oomen ................ B60Q 1/0017
                                                            362/519

FOREIGN PATENT DOCUMENTS

JP              11170910 A    *  6/1999  ........... G03H 1/2202

* cited by examiner

*Primary Examiner* — Jade R Chwasz
(74) *Attorney, Agent, or Firm* — Mintz Levin Cohn Ferris Glovsky and Popeo, P.C.; Kongsik Kim; Jhongwoo Jay Peck

(57) ABSTRACT

An automotive hologram image producing lamp is provided. The automotive hologram image producing lamp includes beam exposed to the exterior to be provided in the form of a hologram image. The automotive hologram image producing lamp includes a light source configured to emit light, a hologram forming unit configured to receive incidence of a first partial light among the emitted light to form a hologram and a light pattern forming unit configured to transmit a second partial light among the emitted light to form a information providing light pattern.

7 Claims, 31 Drawing Sheets

AUTOMOTIVE HOLOGRAM IMAGE PRODUCING LAMP

CROSS-REFERENCE TO RELATED APPLICATIONS

This application claims priority from Korean Patent Application No. 10-2015-0188243 filed on Dec. 29, 2015 in the Korean Intellectual Property Office, the disclosure of which is incorporated herein by reference in its entirety.

BACKGROUND

1. Field of the Invention

The present disclosure relates to an automotive hologram image producing lamp. More particularly, the present disclosure relates to an automotive hologram image producing lamp that allows beam exposed to the exterior to be provided in the form of a hologram image.

2. Description of the Related Art

Generally, a vehicle is equipped with lamps that have a lighting function to determine objects located around the vehicle during low light conditions (e.g., night driving), and a signaling function for notifying the driving state of the vehicle to other vehicles or road users. For example, head lamps, fog lights and the like are mainly intended for lighting function, and turn signal lamps, rear lamps, tail lamps, side markers and the like are mainly intended for signaling function, and in some cases, may perform both of the lighting function and the signaling function.

Recently, a lamp module provides a beam of a specific form to be emitted to the exterior to improve visibility and to improve the recognition of a product of a particular manufacturer, beyond the lighting function and the signaling function. Additionally, a technique of deforming the form of beam emitted to the exterior has been adapted by numerous vehicles. Accordingly, an appearance of an automotive lamp capable of imparting clear differentiation from other products is required.

The above information disclosed in this section is merely for enhancement of understanding of the background of the invention and therefore it may contain information that does not form the prior art that is already known in this country to a person of ordinary skill in the art.

SUMMARY

An object of the present disclosure allows beam exposed to the exterior of an automotive hologram image producing lamp to be provided in the form of a hologram image. The An aspect of the present disclosure provides an automotive hologram image producing lamp that includes a light source configured to emit light, a hologram forming unit configured to receive incidence of a first partial light among the emitted light to form a hologram, and a light pattern forming unit configured to transmit a second partial light among the emitted light to form a information providing light pattern.

According to the automotive hologram image producing lamp of the present disclosure as described above, there is an advantage of allowing beam exposed to the exterior of the automotive lamp to be provided in the form of a hologram image, that may improve visibility and recognition of a product of a particular manufacturer.

BRIEF DESCRIPTION OF THE DRAWINGS

The above and other aspects and features of the present disclosure will become more apparent by describing in detail exemplary embodiments thereof with reference to the attached drawings, in which.

DETAILED DESCRIPTION

Figure 1:
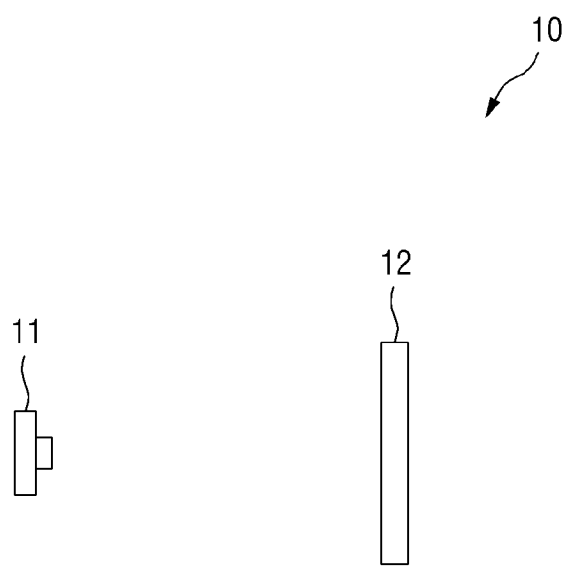
FIGS. 1 and 2 are exemplary diagrams illustrating an automotive hologram image producing lamp according to an exemplary embodiment of the present disclosure.

Hereinafter, an exemplary embodiment of the present disclosure will be described in detail with reference to the accompanying drawings. Advantages and features of the present disclosure, and methods for achieving the same will become more apparent with reference to embodiments to be described in detail in conjunction with the accompanying drawings. However, the present disclosure may be provided in many different forms rather than being limited to the embodiments described below. The present embodiments are provided to simply make the disclosure the present disclosure complete and to fully convey the scope of the disclosure to those having ordinary knowledge in the art to which this disclosure pertains, and the present disclosure is only defined by the categories of claims. The same reference numerals throughout the specification refer to the same components.

Unless otherwise specified, all terms used herein (including technical and scientific terms) could be used as meanings that may be commonly understood to those of ordinary skill in the art to which this disclosure pertains. Moreover, unless the terms that are commonly used and predefined are clearly specifically defined, the terms are not ideally or excessively interpreted.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, in order to make the description of the present invention clear, unrelated parts are not shown and, the thicknesses of layers and regions are exaggerated for clarity. Further, when it is stated that a layer is "on" another layer or substrate, the layer may be directly on another layer or substrate or a third layer may be disposed therebetween.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Figure 2:
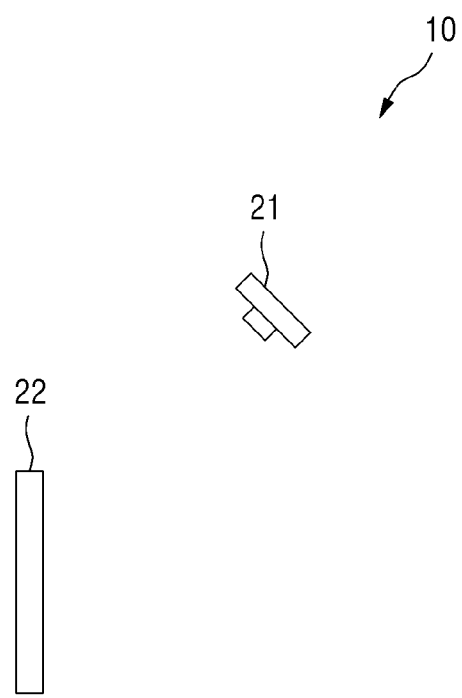

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles FIGS. 1 and 2 are exemplary diagrams illustrating an automotive hologram image producing lamp according to an exemplary embodiment of the present disclosure. Referring to FIG. 1, an automotive hologram image producing lamp 10 may include a light source 11 and a hologram storage medium 12. The light source 11 may be a light emitting module for generating beam, and may be one of any light source that may be used for hologram reproduction, such as a light emitting diode (LED), laser, and a bulb type light source. Hologram information may be recorded on the hologram storage medium 12. The hologram storage medium 12 may record interference fringes generated by interference between a reference beam and an object beam as the hologram information. The hologram may be generated by interference between the lights, and it may be necessary to record the interference fringes on the hologram storage medium 12 by the reference beam and the object beam in order to achieve the hologram.

The reference beam means beam that may be directly illuminated on the hologram storage medium 12 among the lights by any light source, and the object beam means beam that may be reflected by the object among the lights of the light source. By illumination of both of the reference beam and the object beam on the hologram storage medium 12, the interference fringes are recorded on the hologram storage medium 12. By the interference between the reference beam and the object beam, the fringes are formed on the hologram storage medium 12, and the fringes are recorded as the hologram information.

In other words, when the light having the same wavelength and phase as those of the reference beam used to record the hologram information on the hologram storage medium 12 is illuminated on the hologram storage medium 12, the hologram may be reproduced. Thus, the wavelength and phase of beam using the light source 11 of the present disclosure may be identical (e.g., substantially similar) to the wavelength and phase of the reference beam, respectively.

Further, a position of the light source 11 and an arrangement angle of a reflector to be described below may be determined such that the direction and angle of the reference beam to the hologram storage medium 12 are similarly achieved. In particular, the direction and angle of the reference beam facing the hologram storage medium 12 are same as the direction and angle of the irradiation of beam (hereinafter, referred to as a reproducing beam) of the light source 11 facing the hologram storage medium 12.

For example, the positions of the object and the hologram may be synchronized. In particular, by setting the same direction and angle of the reference beam and the reproducing beam, the hologram may be formed at a position where there is an object based on the hologram storage medium 12. The hologram storage medium 12 according to an exemplary embodiment of the present disclosure may be desirably formed in a plate shape such as a film, but may be not limited thereto.

FIG. 1 illustrates a hologram storage medium 12 that forms a transmission type hologram. When the light of the light source 11 is transmitted through the hologram storage medium 12, the hologram may be formed. Referring to FIG. 2, the automotive hologram image producing lamp 10 may be configured to include a light source 21 and a hologram storage medium 22. Since the functions of the light source 21 and the hologram storage medium 22 are identical or similar to those of the light source 11 and the hologram storage medium 12 described above, the detailed description thereof will not be provided. However, FIG. 2 illustrates the hologram storage medium 22 that may form the reflection type hologram. When the light of the light source 21 is reflected by the hologram storage medium 22, the hologram may be formed.

Figure 3:
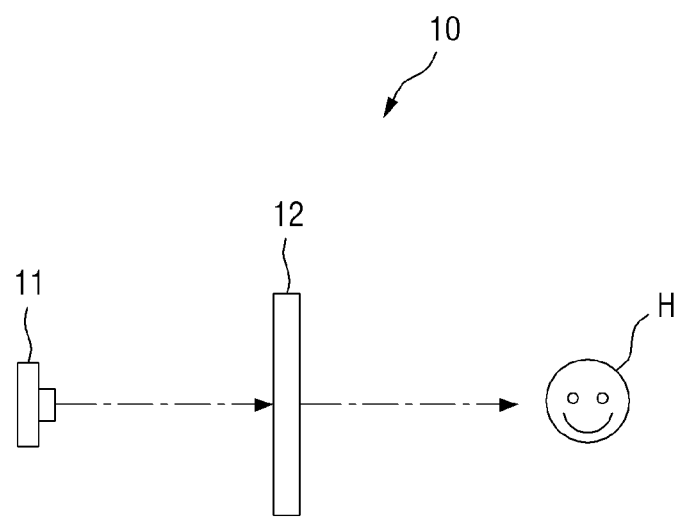
FIGS. 3 and 4 are exemplary diagrams illustrating the hologram formed by the automotive hologram image producing lamp according to an exemplary embodiment of the present disclosure.
Figure 4:
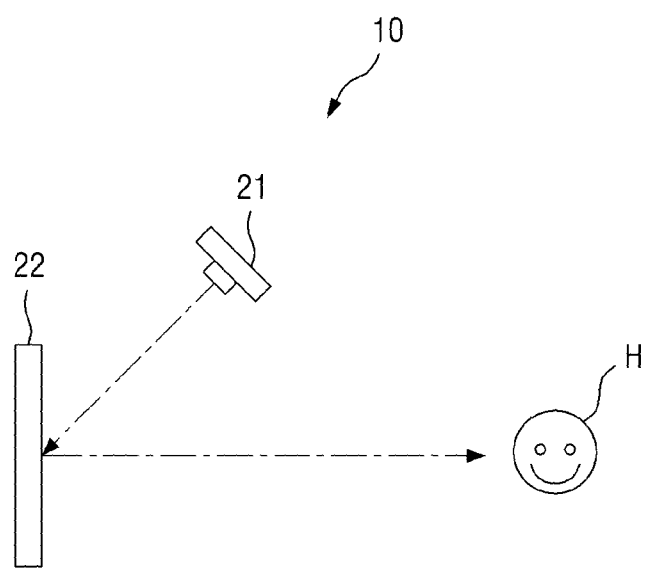

FIGS. 3 and 4 are diagrams illustrating the hologram formed by the automotive hologram image producing lamp according to an exemplary embodiment of the present disclosure. As described above, the hologram storage media 12 and 22 of the present disclosure may form a transmission type hologram H or a reflection type hologram H. In particular, as illustrated in FIG. 3, when the light of the light source 11 is transmitted through the hologram storage medium 12, the transmission type hologram H may be formed. Or, as illustrated in FIG. 4, when the light of the light source 21 is reflected by the hologram storage medium 22, the reflection type hologram H may be formed. A region of the hologram storage medium 12 on which the hologram information for the transmission type hologram H may be recorded for the formation of the transmission type hologram H may have transmittance of a predetermined magnitude or more. Similarly, a region of the hologram storage medium 22 on which the hologram information for the reflection type hologram H may be recorded for the formation of the reflection type hologram H may have reflectance of a certain magnitude or more.

Further, although it is not illustrated, the automotive hologram image producing lamp 10 may further include a reflector that reflects light from the light sources 11 and 21. To insure that a proper hologram may be formed, there is a need to secure a sufficient distance between the light sources 11 and 21 and the hologram storage media 12 and 22. However, it may be structurally difficult to sufficiently provide the direct distance between the light sources 11 and 21 and the hologram storage media 12 and 22. When, at least one reflector reflects the light of the light sources 11 and 21, it may be possible to secure a sufficient distance between the light sources 11 and 21 and the hologram storage media 12 and 22.

The automotive hologram image producing lamp 10 according to an exemplary embodiment of the present disclosure may be disposed within a lamp housing that forms a unique light pattern, such as the tail lamps or the turn signal lamps. In particular, a vehicle equipped with the automotive hologram image producing lamp 10 of the present disclosure, for example, may form a hologram with the light patterns of the tail lamps, or may form the hologram with the light patterns of the turn signal lamps. The light patterns of the tail lamps, the light patterns of the turn signal lamps and hologram may be irradiated in the same direction or may be irradiated in the similar direction. Thus, an observer may observe the light pattern and hologram of the tail lamps at the same time or may observe the light patterns and the hologram of the turn signal lamps at the same time.

A light source, a reflector, a lens or the like used to form the specific light pattern may be included inside the housing of the lamp that forms the existing light pattern. Here, the internal cavity of the housing may be a cavity for receiving the various components for the formation of the light pattern, and may interfere with the existing components when the automotive hologram image producing lamp 10 may be included inside the housing.

The automotive hologram image producing lamp 10 according to the exemplary embodiment of the present disclosure may be included in the housing of the existing lamp, while mitigating the interference with the existing components. Hereinafter, the automotive hologram image producing lamp 10 that also achieves the holographic image, while forming the specific light pattern will be described in detail.

Figure 5:
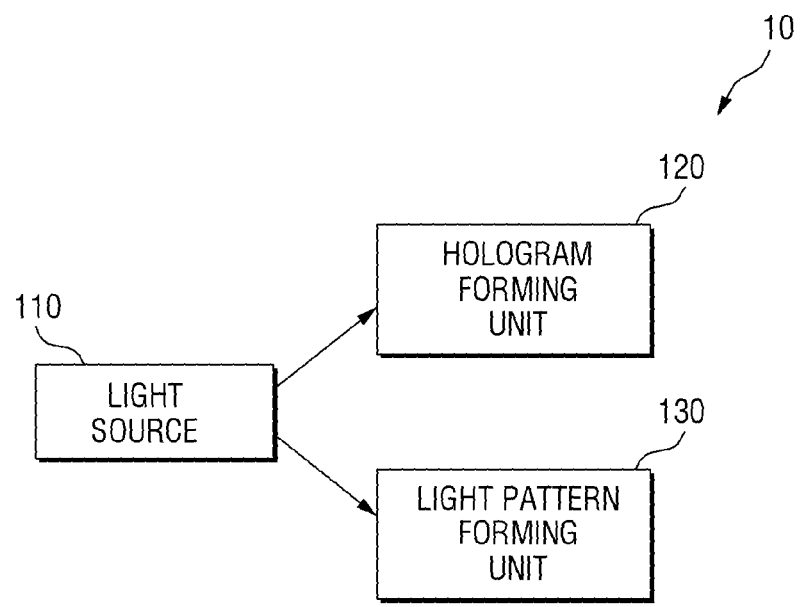
FIGS. 5 and 6 are exemplary block diagrams of the automotive hologram image producing lamp according to an exemplary embodiment of the present disclosure.
Figure 6:
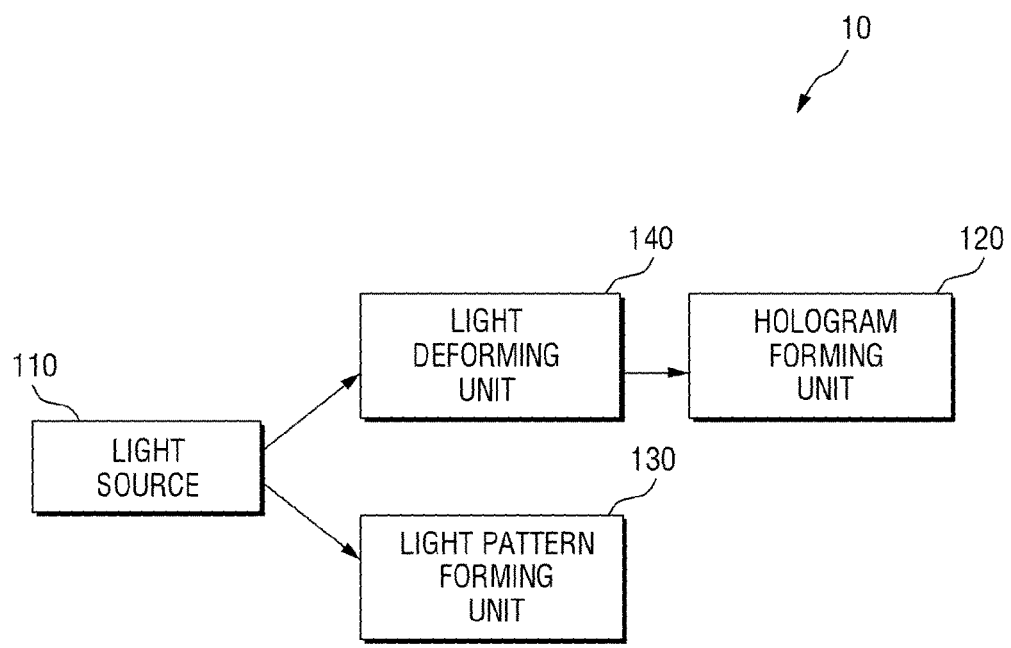

FIGS. 5 and 6 are block diagrams of the automotive hologram image producing lamp according to an exemplary embodiment of the present disclosure.

Referring to FIG. 5, the automotive hologram image producing lamp 10 may include a light source 110, a hologram forming unit 120 and a light pattern forming unit 130.

A light source 110 serves to irradiate the light. Since the function of the light source 110 may be identical or similar to that of the aforementioned light source 11, the detailed description thereof will not be provided.

However, the light source 110 according to an exemplary embodiment of the present disclosure may be used to form the hologram, and may be used to form a light pattern of predetermined shape. The light source 110, the hologram forming unit 120 and the light pattern forming unit 130, for example, may be disposed within the tail lamps or the turn signal lamps of the vehicle. The light of the light source 110 may be used to form at least one light pattern among the tail lamps, the brake lamps, the turn signal lamps, the reversing lamps, and the user's selection information. Further, when a light deforming unit 140 may be included in the automotive hologram image producing lamp 10 as illustrated in FIG. 6, the light deforming unit 140 may also be disposed within the tail lamps or the turn signal lamps of the vehicle. Here, the user's selection information, for example, may include a light pattern of an interlocked motion of the tail lamps and the turn signal lamp, as another light pattern that uses at least one of the tail lamps and the turn signal lamps.

Hereinafter, the light pattern trying to provide specific information, such as light patterns of tail lamps, brake lamps, turn signal lamps, reversing lamps or the user's selection information, will be referred to as information providing light pattern. In other words, light from the light source 110 may be used to form the hologram and the information providing light pattern. In particular, some parts of the light source 110 may be used for the formation of the hologram, and the remaining parts thereof may be used for formation of the information providing light pattern. Hereinafter, the light used to form the hologram among the lights emitted from the light source 110 may be referred to as a hologram partial light Lh, and the light used to form the formation providing light pattern among the lights emitted from the light source 110 may be referred to as a light pattern partial light Lp.

The hologram forming unit 120 serves to form a hologram by receiving incidence of the hologram partial light Lh. The hologram forming unit 120 may form a transmission type hologram or may form a reflection type hologram. The hologram forming unit 120 may include a hologram storage medium on which the hologram information may be recorded. The hologram storage medium includes interference fringes that are generated by the interference between the reference beam and the object beam and recorded as the hologram information. The wavelength and the phase of the light emitted from the light source 110 are identical to the wavelength and phase of the reference beam, respectively.

Moreover, the light emitted from the light source 110 may not correspond to the reference beam. For example, the reference beam may be a parallel beam, and the light emitted from the light source 110 may not be a parallel light. Thus, as illustrated in FIG. 6, the automotive hologram image producing lamp 10 according to an exemplary embodiment of the present disclosure may include a light deforming unit 140 that deforms the hologram partial light Lh. The light deforming unit 140 may be configured to convert the hologram partial light Lh into the parallel light and may irradiate the hologram forming unit 120 with the parallel beam. When the hologram forming unit 120 is directly irradiated with the hologram partial light Lh, the hologram may not be formed. However, as the hologram forming unit 120 may be irradiated with beam converted by the light deforming unit 140, the hologram may be formed.

The light deforming unit 140 may be configured to convert the hologram partial light Lh into the parallel light and may convert the hologram partial light Lh to have properties similar to the reference beam. For example, the light deforming unit 140 may convert the hologram partial light Lh to make the wavelength and phase of the hologram partial light Lh identical to the wavelength and phase of the reference beam.

The hologram forming unit 120 may optionally include a reflector that reflects the hologram partial light Lh and may be configured to guide the hologram partial light to the hologram storage medium. When the direct light of the light source 110 is transferred to the hologram storage medium based on the position of the light source 110, the reflector may not be provided. However, when the direct light of the light source 110 is not transferred to the hologram storage medium, a reflector that reflects the light of the light source 110 and guides the light to the hologram storage medium may be provided in the hologram forming unit 120.

The light pattern forming unit 130 may be configured to form the information providing light pattern by transmitting the light pattern partial light Lp. In particular, the light pattern forming unit 130 may display at least one of the tail lamps, the brake lamps, the turn signal lamps, the reversing lamps and the user's selection information. In the present disclosure, the light pattern forming unit 130 includes a light guide. In particular, the light pattern forming unit 130 may be a transparent or semi-transparent light guide. As the light pattern partial light Lp may be transmitted through the light pattern forming unit 130 as a light guide, an observer who views the light may recognize that the light may be diverged in the form of the light pattern forming unit 130. Further, the light pattern forming unit 130 may include a color filter. Thus, as the light pattern partial light Lp may be transmitted, light of a particular color may be recognized by the observer. Further, the light pattern forming unit 130 may include a lens (not illustrated). Thus, the light may be concentrated or dispersed based on the shape of the lens to form the information providing light pattern.

Figure 7:
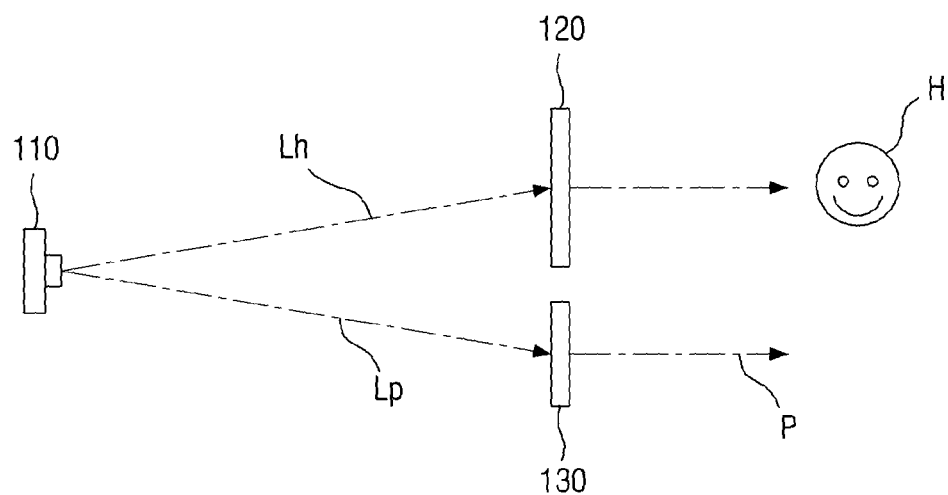
FIGS. 7 to 9 are exemplary diagrams illustrating the light pattern formed by the automotive hologram image producing lamp according to an exemplary embodiment of the present disclosure.
Figure 8:
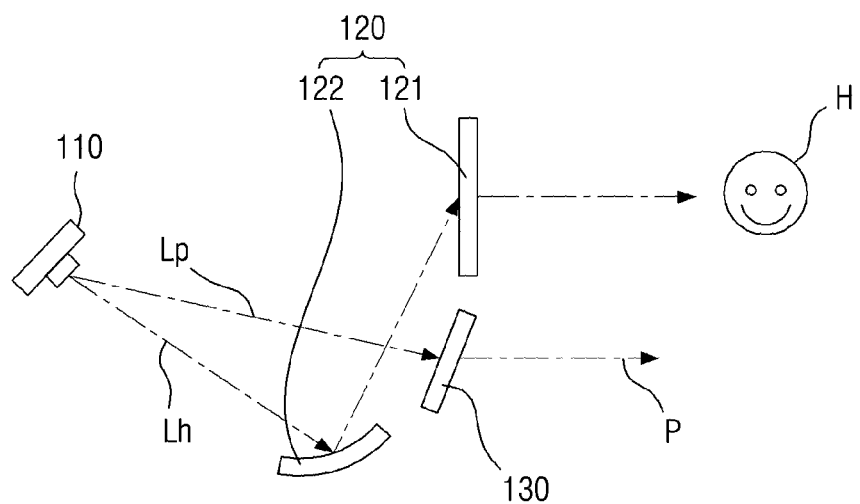
Figure 9:
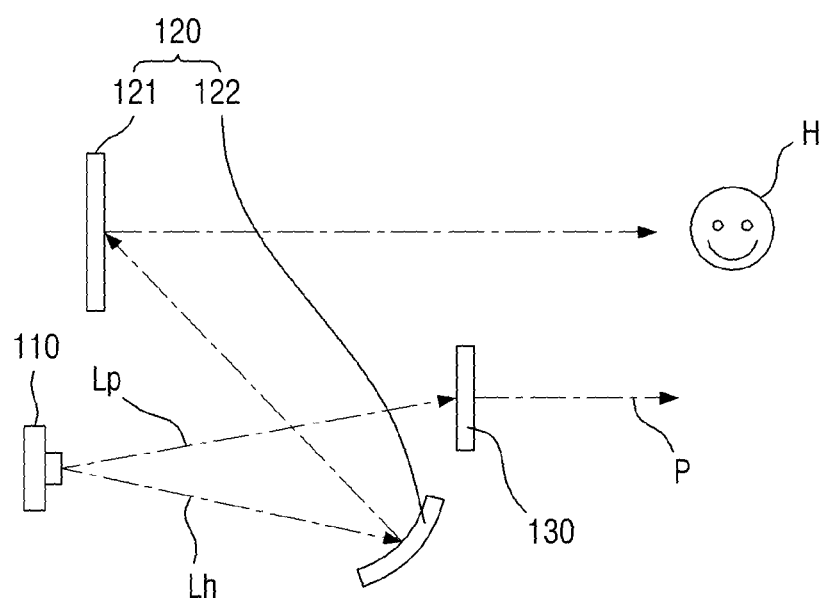

FIGS. 7 to 9 are diagrams illustrating the light pattern formed by the automotive hologram image producing lamp according to an exemplary embodiment of the present disclosure. As illustrated in FIG. 7, as the a light source 110 emits the lights Lh and Lp, the hologram H and the information providing light pattern P may be formed. As the hologram partial light Lh may be transmitted through the hologram forming unit 120, the transmission type hologram H may be formed, and as the light pattern partial light Lp may be transmitted through the light pattern forming unit 130, the information providing light pattern P may be formed. Since the direct light of the light source 110 may be transferred to each of the hologram forming unit 120 and the light pattern forming unit 130, the hologram forming unit 120 may be made up of only the hologram storage medium, and may not include another reflector.

As illustrated in FIG. 8, as the light source 110 emits the lights Lh and Lp, the hologram H and the information providing light pattern P may be formed. When the hologram partial light Lh is transmitted through the hologram forming unit 120, the transmission type hologram H may be formed, and the light pattern partial light Lp may be transmitted through the light pattern forming unit 130, the information providing light pattern P may be formed. When the hologram partial light Lh is not structurally directly transferred to the hologram storage medium 121, the hologram forming unit 120 may include a reflector 122. For example, when there may be an obstacle (not illustrated) between the light source 110 and the hologram storage medium 121, or when the hologram storage medium 121 is not included in the light irradiation range of the light source 110, the reflector 122 may be provided.

As illustrated in FIG. 9, as the light source 110 emits the light, the holograms H and the information providing light pattern P may be formed. When the hologram partial light Lh may be reflected by the hologram forming unit 120, the reflection type hologram H may be formed, and as the light pattern partial light Lp is transmitted through the light pattern forming unit 130, the informational providing light pattern P may be formed. To achieve the reflection type hologram H and the information providing light pattern P at the same time, the hologram forming unit 120 may include the reflector 122. Since the direct light emitted from a single light source 110 may not be transferred to the hologram storage medium 121 and the light pattern forming unit 130, the reflector 122 may be provided.

In other words, the automotive hologram image producing lamp 10 according to an exemplary embodiment of the present disclosure may form the hologram H and the information providing light pattern P, using only a single light source 110. Since only a single light source 110 may be used, it is possible to improve the utilization efficiency of the internal cavity of the housing. For example, by adding the hologram forming unit 120 to the housing of the conventional tail lamps or turn signals, the automotive hologram image producing lamp 10 of the present disclosure may be achieved.

Figure 10:
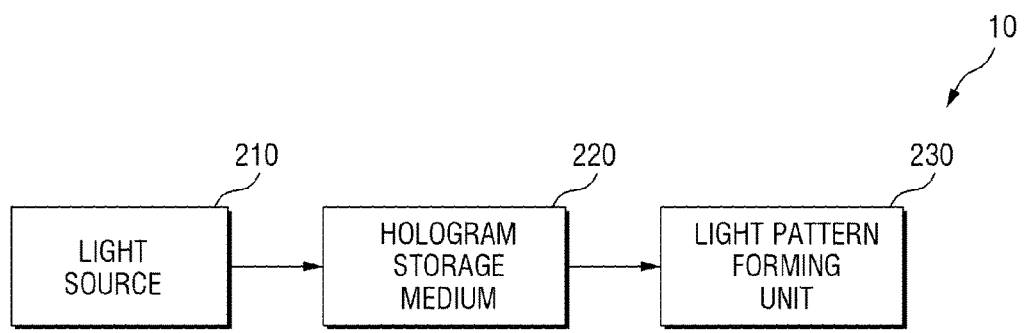
FIGS. 10 and 11 are exemplary block diagrams of an automotive hologram image producing lamp according to another exemplary embodiment of the present disclosure.
Figure 11:
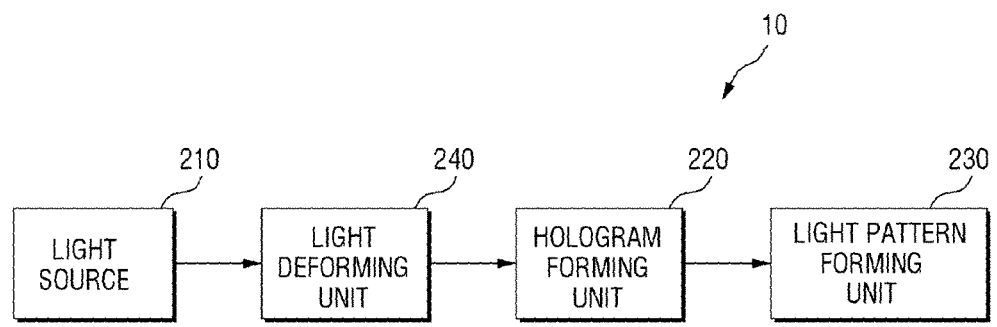

FIGS. 10 and 11 are block diagrams of an automotive hologram image producing lamp according to another exemplary embodiment of the present disclosure. Referring to FIG. 10, an automotive hologram image producing lamp 10 may include a light source 210, a hologram storage medium 220 and a light pattern forming unit 230. The light source 210 may be configured to emit the light. Since the function of the light source 210 may be identical or similar to that of the aforementioned light source 11, the detailed description thereof will not be provided.

However, the light source 210 according to another exemplary embodiment of the present disclosure may be used to form the hologram, and may also be used to form the information providing light pattern. The light source 210, the hologram storage medium 220, and the light pattern forming unit 230, for example, may be disposed within the tail lamps and the turn signal lamps of the vehicle. The light of the light source 210 may be used to form the information providing light pattern. Further, as illustrated in FIG. 11, when the light deforming unit 240 may be included in the automotive hologram image producing lamp 10, the light deforming unit 240 may also be disposed within the tail lamps and turn signal lamps of the vehicle.

In other words, light from the light source 210 may be used to form the hologram and the information providing light pattern. In particular, light from the light source 210 forms the hologram, while being transmitted through the hologram storage medium 220, and the light transmitted through the hologram storage medium 220 may be transmitted to the light pattern forming unit 230 to form the information providing light pattern. The hologram storage medium 220 may be configured to form the hologram corresponding to the recorded hologram information by transmitting the light emitted from the light source 210. Since the hologram storage medium 220 may be identical or similar to the aforementioned hologram storage medium 12, the detailed description thereof will not be provided.

Furthermore, the light emitted from the light source 210 may not correspond to the reference beam. For example, the reference beam may be a parallel beam, and meanwhile, the light emitted from the light source 210 may not be a parallel light. Thus, as illustrated in FIG. 11, the automotive hologram image producing lamp 10 according to another exemplary embodiment of the present disclosure may include a light deforming unit 240 that deforms light of the light source 210. Since the functions of the light deforming unit 240 are identical or similar to those of the light deforming unit 140, the detailed description thereof will not be provided.

The automotive hologram image producing lamp 10 may include a reflector configured to reflect the light of the light source 210 and guide the light to the hologram storage medium 220. The light of the light source 210 may not be transmitted to the hologram storage medium 220 depending on the position of the light source 210, and in such a case, a reflector that reflects the light of the light source 210 and guides the light to the hologram storage medium 220 may be provided in the automotive hologram image producing lamp 10.

The light pattern forming unit 230 may be configured to form the light pattern of a certain form. In other words, the information providing light pattern, may receive the incidence of light transmitted by the hologram storage medium 220. In particular, the light pattern forming unit 230 may display at least one of the tail lamps, the brake lamps, the turn signal lamps, the reversing lamps and the user's selection information. The light pattern forming unit 230 may include at least one of the reflector and the light guide in the present disclosure. In particular, when playing the role of the light guide, the light pattern forming unit 230 may be a transparent or semi-transparent light guide. When the light pattern partial light is transmitted through the light pattern forming unit 230 that is a light guide, an observer who views the light may recognize that the light is diverged in the form of the light pattern forming unit 230. Further, the light pattern forming unit 230 may include a color filter. Accordingly, when the light pattern partial light is transmitted, light of a particular color may be recognized by the observer.

Figure 15:
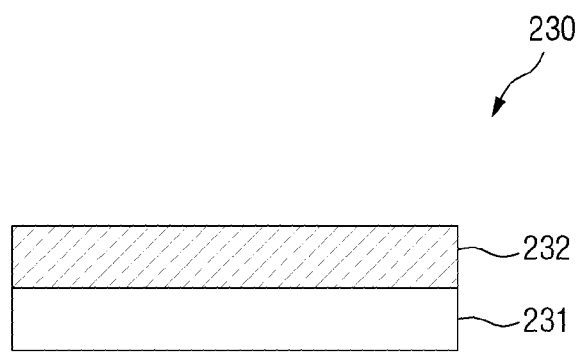
FIG. 15 is an exemplary diagram illustrating a reflector according to another exemplary embodiment of the present disclosure.

When playing the role of the reflector, the light pattern forming unit 230 may be configured to reflect the light transmitted through the hologram storage medium 220 to form the information providing light pattern. For example, the reflector may include a bezel on which metal oxide may be deposited. As illustrated in FIG. 15, the metal oxide 232 may be deposited on the bezel 231 to provide the light pattern forming unit 230 of the reflector form. However, when the bezel serves as the reflector may be an example, and another reflecting means for reflecting another light may serve as a reflector. Further, the light pattern forming unit 230 may include a lens (not illustrated). Thus, the light may be concentrated or dispersed based on the form of the lens to form the information providing light pattern.

Figure 12:
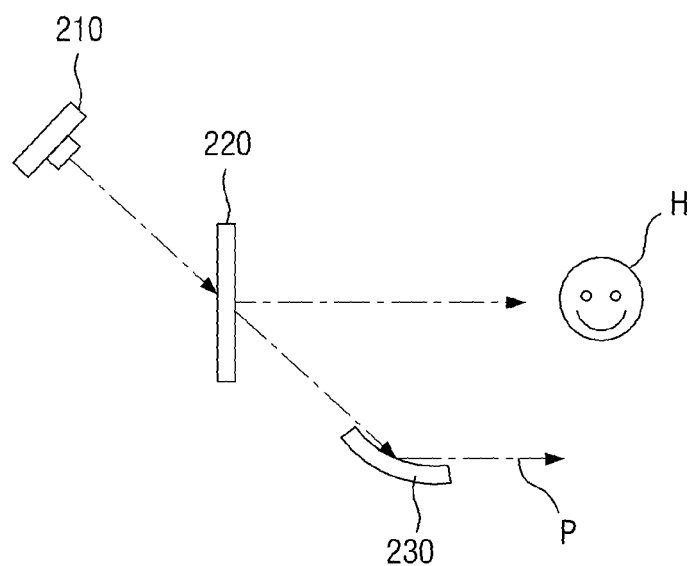
FIGS. 12 to 14 are exemplary diagrams illustrating the light pattern formed by the automotive hologram image producing lamp according to another exemplary embodiment of the present disclosure.
Figure 13:
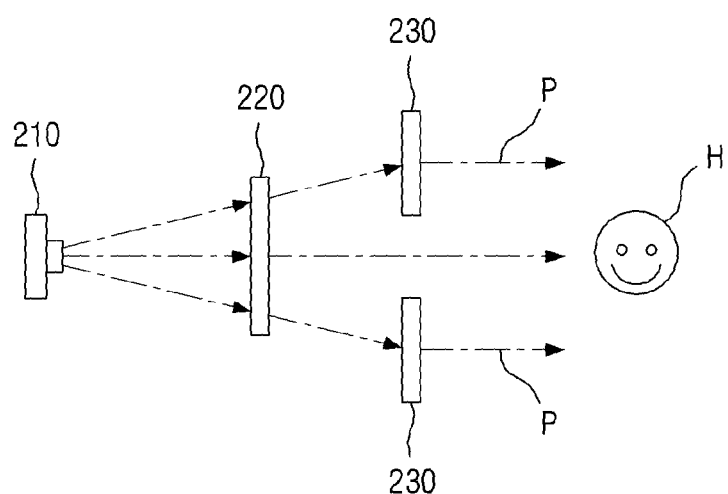
Figure 14:
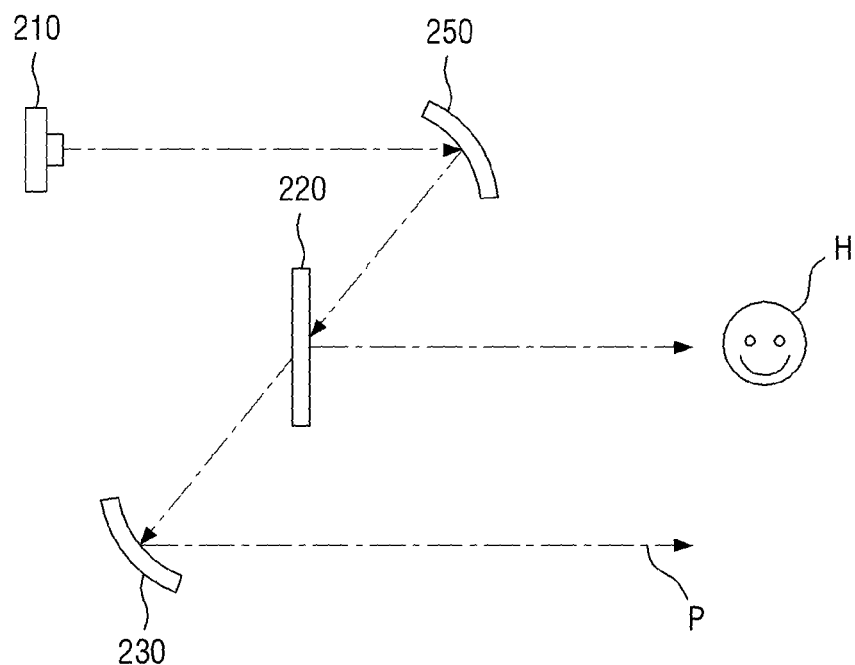

FIGS. 12 to 14 are diagrams illustrating the light pattern formed by the automotive hologram image producing lamp according to another exemplary embodiment of the present disclosure. As illustrated in FIG. 12, when the light source 210 emits the light, the hologram H and the information providing light pattern P may be formed. When the light is transmitted through the hologram storage medium 220, the transmission type hologram H may be formed, and when the transmitted light is reflected by the light pattern forming unit 230, the information providing light pattern P may be formed. The light pattern forming unit 230 may serve as a reflector. For example, the light pattern forming unit 230 may be a bezel on which metal oxide may be deposited.

As illustrated in FIG. 13, as the light source 210 emits the light, the hologram H and the information providing light pattern P may be formed. When the light is transmitted through the hologram storage medium 220, the transmission type hologram H may be formed, and when the transmitted light is transmitted through the light pattern forming unit 230, the information providing light pattern P may be formed. The light pattern forming unit 230 may serve as a light guide. For example, the light pattern forming unit 230 may be a transparent or semitransparent light guide.

As illustrated in FIG. 14, when the light source 210 emits the light, the hologram H and the information providing light pattern P may be formed. When the light reflected by the reflector 250 is transmitted through the hologram storage medium 220, the hologram H may be formed. When the light transmitted through the hologram storage medium 220 is reflected by the light pattern forming unit 230, the information providing light pattern P may be formed. The hologram H formed by the hologram storage medium 220 may be a reflection type hologram. A portion of the light emitted to the hologram storage medium 220 may be configured to form the reflection type hologram H, while being reflected by the hologram storage medium 220. The remaining light may be transmitted and may be transferred to the light pattern forming unit 230.

The light pattern forming unit 230 serves as a reflector. For example, as illustrated in FIG. 15, the light pattern forming unit 230 may be a bezel 231 on which a metal oxide 232 may be formed. In other words, the automotive hologram image producing lamp 10 according to another exemplary embodiment of the present disclosure may form the hologram H and the information providing light pattern P, using one light source 210. Since one light source 210 may be used, the utilization efficiency of the internal cavity of the housing may be improved. For example, the automotive hologram image producing lamp 10 of the present disclosure may be achieved by adding the hologram storage medium 220 to the housing of a conventional tail lamp or turn signal lamp.

Figure 16:
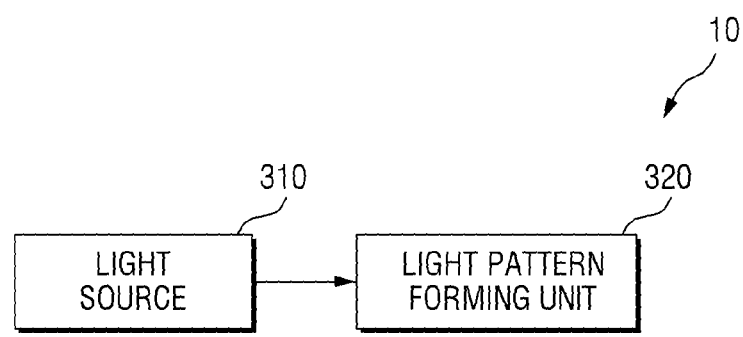
FIG. 16 is an exemplary block diagram of an automotive hologram image producing lamp according to still another exemplary embodiment of the present disclosure.

FIG. 16 is an exemplary block diagram of an automotive hologram image producing lamp according to still another exemplary embodiment of the present disclosure. Referring to FIG. 16, the automotive hologram image producing lamp 10 may include a light source 310 and a light pattern forming unit 320. The light source 310 may be configured to emit the light. Since the functions of the light source 310 are identical or similar to the aforementioned light source 11, the detailed description thereof will not be provided.

The light source 310 according to another exemplary embodiment of the present disclosure may be used to form the hologram, and may also be used to form the hologram and the information providing light pattern. The light source 310 and the light pattern forming unit 320, for example, may be disposed within the tail lamps and the turn signal lamps of the vehicle, and the light pattern forming unit 320 may form only the hologram using the light of the light source 310 or may form the hologram and the information providing light pattern. The information providing light pattern may include at least one of the tail lamps, the brake lamps, the turn signal lamps, the reversing lamps and the user's selection information.

The light pattern forming unit 320 may be configured to form the first light pattern, using the first partial light among the light emitted by the light source 310, and may be configured to form the second light pattern, using the second partial light among the light emitted by the light source 310. In particular, at least one of the first light pattern and the second light pattern may include the hologram. For example, one of the first light pattern and the second light pattern may be a hologram, or both of the first light pattern and the second light pattern may be a hologram. Further, the first light pattern and the second light pattern may provide an image on the same plane, or any one of the first light pattern and the second light pattern may provide a protruding image as compared to the other thereof. The reflection type hologram may provide a protruding image as compared to the transmission type hologram. Further, the information providing light pattern P may provide a protruding image as compared to the transmission type hologram. Further, the reflection type hologram provides a protruding image as compared to the information providing light pattern.

Accordingly, both of the first light pattern and the second light pattern according to another exemplary embodiment of the present disclosure may be a transmission type hologram. Conversely, both of the first light pattern and the second light pattern may be a reflection type hologram. In some exemplary embodiments, the first light pattern and the second light pattern may be a transmission type hologram and a reflection type hologram. In other exemplary embodiments, the first light pattern and the second light pattern may be the transmission type hologram and the information providing light pattern. The first light pattern and the second light pattern may be the information providing light pattern and the reflection type hologram. When both of the first light pattern and the second light pattern are the transmission type hologram or the reflection type hologram, the first light pattern and the second light pattern may provide an image on the same plane.

In contrast, when the first light pattern and the second light pattern are holograms of different types or a combination of the hologram and the information providing light pattern, the first light pattern and the second light pattern may provide a relatively protruding image and a relatively non-protruding image at the same time. When one of the first light pattern and the second light pattern provides a protruding image as compared to the other, an observer may feel a deeper three-dimensional effect.

Hereinafter, various combinations of the first light pattern and the second light pattern that sustainably simultaneously provide the protruding image and the non-protruding image will be described. First, a case where the first light pattern and the second light pattern are made up of a combination of the transmission type hologram and the reflection type hologram will be described. In particular, of the first light pattern and the second light pattern, the light pattern which provides the protruding image may include the reflection type hologram, and the light pattern which provides another image rather than the protruding image includes the transmission type hologram.

Figure 17:
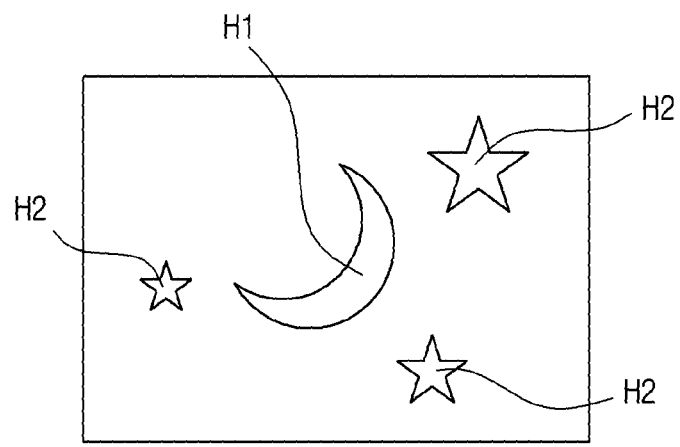
FIG. 17 is an exemplary diagram illustrating a first light pattern and a second light pattern according to an exemplary embodiment of the present disclosure.

In particular, as a case where the second light pattern provides the protruding image and the first light pattern provides the non-protruding image, as illustrated in FIG. 17, a case where the first light pattern and the second light pattern are each of the transmission type hologram H1 and the reflection type hologram H2 will be described. The aforementioned light pattern forming unit 320 may includes the hologram storage medium 321 and the reflector. The hologram information on the transmission type hologram H1 and the reflection type hologram H2 may be recorded on the hologram storage medium 321. Thus, when the light is transmitted through the hologram storage medium 321 or is reflected by the hologram storage medium 321, the transmission type hologram H1 and the reflection type hologram H2 may be formed.

Figure 18:
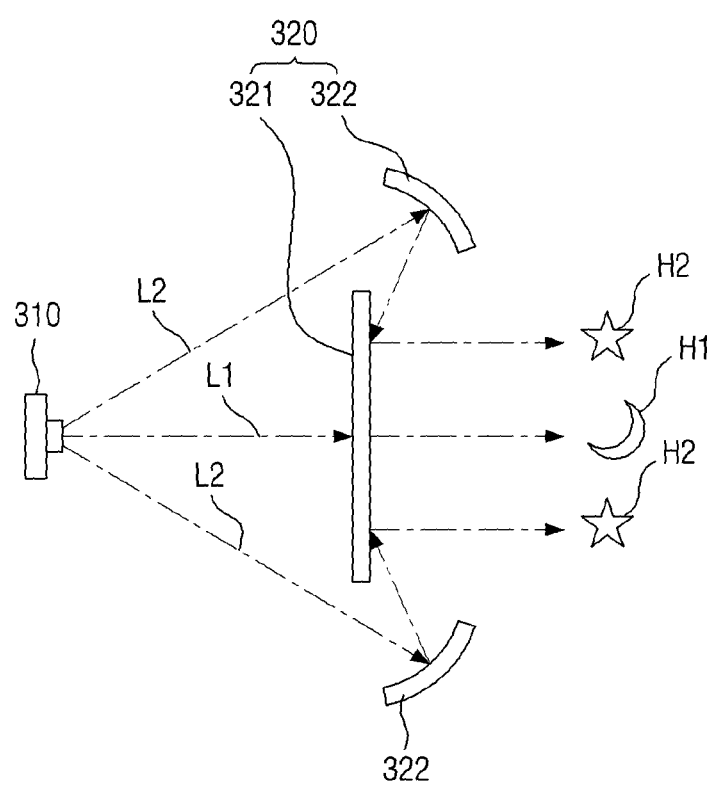
FIGS. 18 to 21 are exemplary diagrams illustrating the light pattern formed by the automotive hologram image producing lamp according to still another exemplary embodiment of the present disclosure.

The reflector may be configured to reflect the first partial light or the second partial light and to guide the first partial light or the second partial light to the hologram storage medium 321. FIGS. 18 to 21 illustrate the automotive hologram image producing lamp 10 that forms a light pattern associated therewith. As illustrated in FIG. 18, as the light source 310 emits the light, the transmission type hologram H1 and the reflection type hologram H2 may be formed. When the first partial light L1 is transmitted through the hologram storage medium 321, the transmission type hologram H1 may be formed, and as the second partial light L2 is reflected by the hologram storage medium 321, the reflection type hologram H2 may be formed. In order to achieve the transmission type hologram H1 and the reflection type hologram the H2 at substantially the same time, the light pattern forming unit 320 may include a reflector 322. Since the direct light emitted from a single light source 310 may not be transferred to both sides of the hologram storage medium 321, the reflector 322 may be provided.

Figure 19:
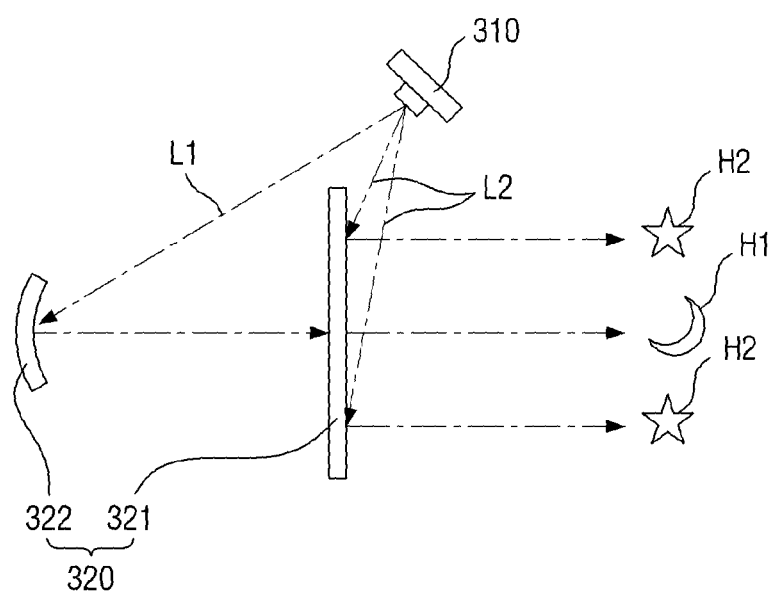

Although FIG. 18 illustrates a configuration in which the first partial light L1 is a direct light and the second partial light L2 is a reflected light, as illustrated in FIG. 19, the first partial light L1 may be a reflected light, and the second partial light L2 may be a direct light. In particular, the first partial light L1 reflected by the reflector 322 may be transmitted through the hologram storage medium 321 to form the transmission type hologram H1, and the second partial light L2 as a direct light may be reflected by the hologram storage medium 321 to form the reflection type hologram H2.

Figure 20:
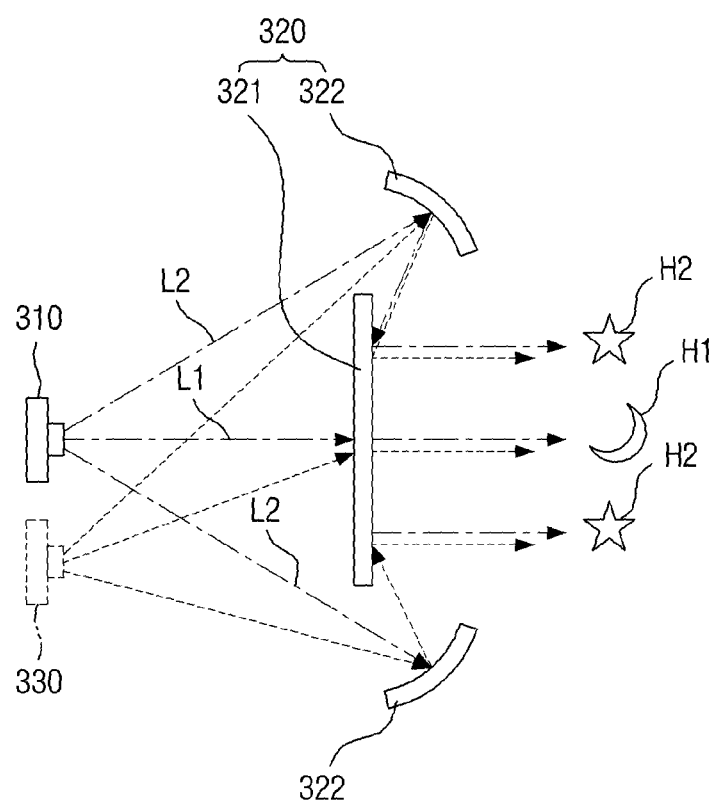
Figure 21:
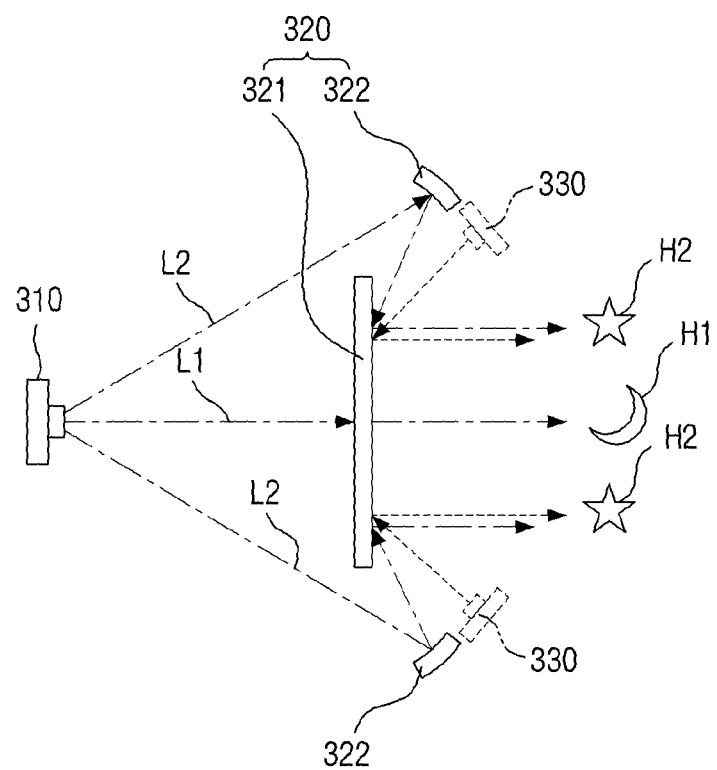

Further, the transmission type hologram H1 and the reflection type hologram H2 may not be correctly formed by a single light source 310. For example, energy may be reduced while light of the light source 310 is reflected by the reflector. The reference beams of the transmission type hologram H1 and the reflection type hologram H2 may be different from each other. Thus, as illustrated in FIGS. 20 and 21, the automotive hologram image producing lamp 10 may be provided with another auxiliary light source 330. In the present disclosure, the auxiliary light source 330 may be configured to emit another light used to form at least one of the first light pattern and the second light pattern. For example, the hologram storage medium 321 may be irradiated with the light of the light source 310 and the light of the auxiliary light source 330 to form the hologram, and the hologram storage medium 321 may be irradiated with only light of the auxiliary light source 330 to form the hologram.

Figure 22:
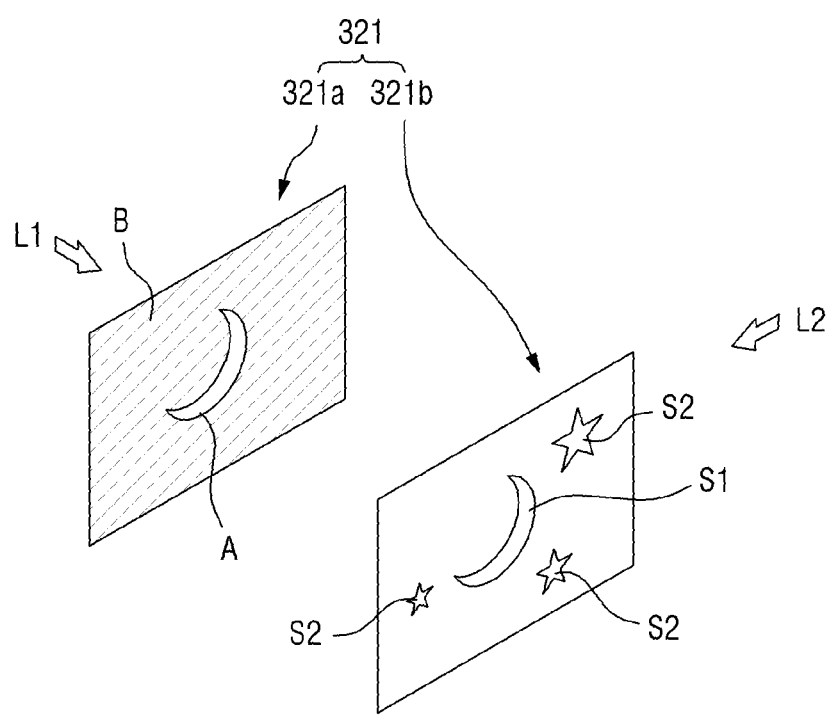
FIGS. 22 to 24 are exemplary diagrams illustrating a hologram reproducing medium that forms the light pattern of FIG. 17.
Figure 23:
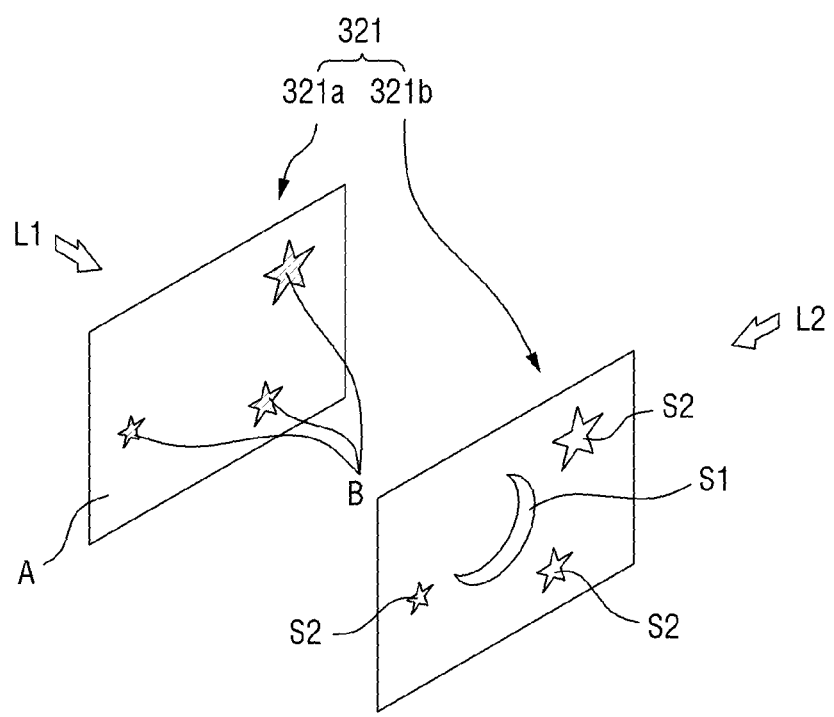
Figure 24:
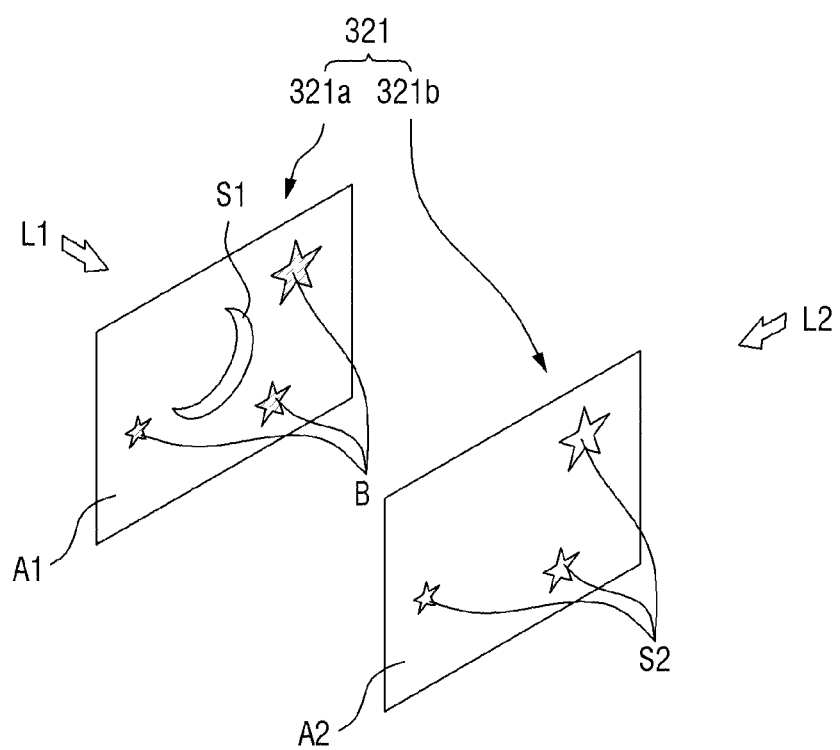

FIGS. 22 through 24 are diagrams illustrating a hologram reproducing medium that forms the light pattern of FIG. 17. The hologram storage medium 321 may include a first pattern panel 321a and a second pattern panel 321b that overlap each other. A first hologram information S1 for forming the transmission type hologram H1, a second hologram information S2 for forming the reflection type hologram H2, a beam obstructing film B for obstructing the transmission of the first partial light L1, and a light transmitting film A for transmitting the first partial light L1 to correspond to the shape of the first hologram information S1 may be optionally included in the first pattern panel 321a and the second pattern panel 321b.

In the present disclosure, the light obstructing film B indicates a film which obstructs the transmission of light, and the light transmitting film A indicates a film which transmits light. The light transmitting film A may directly transmit the incident light without deformation. For example, a material such as a transparent film may serve as a light transmitting film A, and an empty cavity may also serve as the light transmitting film A.

FIG. 22 illustrates a configuration in which the light obstructing film B and the light transmitting film A are included in the first pattern panel 321a and the first hologram information S1 and the second hologram information S2 are included the second pattern panel 321*b*. The first partial light L1 emitted to the first pattern panel 321*a* may be obstructed by the light obstructing film B and may be transmitted through the light transmitting film A. In the first pattern panel 321*s*, the light transmitting film A may be formed to correspond to the form of the first hologram information S1 included in the second pattern panel 321*b*, and the light obstructing film B may be a remaining region excluding the light transmitting film A. Accordingly, the first partial light L1 may be transmitted through the entire region of the first hologram S1. Thus, while the first partial light L1 transmitted through the light transmitting film A may be transmitted through the first hologram information S1 of the second pattern 321*b*, the transmission type hologram panel H1 may be formed.

Since the light obstructing film B is formed on the first pattern panel 321*a* corresponding to the position of the second hologram information S2, the first partial light L1 may not reach the second hologram information S2. However, the second partial light L2 emitted from the direction different from the first partial light L1 may directly reach the second hologram information S2. Accordingly, the second partial light L2 may be reflected by the second hologram information S2, and the reflection type hologram H2 may be formed. In particular, a reflecting means such as a reflection film may be provided on one side of the light obstructing film B facing the second hologram information S2. When the second hologram information S2 may be a transparent or semitransparent material, the reflection efficiency of the second partial light L2 on the surface of the second hologram information S2 may be further improved.

FIG. 23 illustrates a configuration in which the light obstructing film B and the light transmitting film A are included in the first pattern panel 321*a*, and the first hologram information S1 and the second hologram information S2 are included in the second pattern panel 321*b*. The first partial light L1 emitted to the first pattern panel 321*a* may be obstructed by the light obstructing film B and may be transmitted through the light transmitting film A. In the first pattern panel 321, the light obstructing film B may be formed to correspond to the form of the second hologram information S2 included in the second pattern panel 321*b*, and the light transmitting film A may be a remaining region excluding the light obstructing film B. Accordingly, the first partial light L1 may be transmitted through the entire region of the first hologram S1. Thus, while the first partial light L1 transmitted through the light transmitting film A may be transmitted through the first hologram information S1 of the second pattern panel 321*b*, the transmission type hologram H1 may be formed.

Since the light obstructing film B may be formed on the first pattern panel 321*a* corresponding to the position of the second hologram information S2, the first partial light L1 may not reach the second hologram information S2. However, the second partial light L2 emitted from the direction different from the first partial light L1 may not directly reach the second hologram information S2. Thus, the second partial light L2 may be reflected by the second hologram information S 2, and the reflection type hologram H2 may be formed. In particular, the reflecting means such as a reflection film may be provided on one side of the light obstructing film B that faces the second hologram information S2. When the second hologram information S2 may be a transparent or semitransparent material, the reflection efficiency of the second partial light L2 on the surface of the second hologram information S2 may be further improved.

FIG. 24 illustrates a configuration in which a beam obstructing film B, a first light transmitting film A1 and a first hologram information S1 may be included on the first pattern panel 321*a*, and second hologram information S2 and a second light transmitting film A2 may be included on the second pattern panel 321*b*. The first hologram information S1 may be formed on the first light transmitting film A1, or some of the first pattern panel 321*a* may be drilled into the shape of the first hologram information S1, and the first hologram information S1 may be included in the drilled holes. The first partial light L1 emitted to the first pattern panel 321*a* may be obstructed by the light obstructing film B and may be transmitted through the first hologram information S1.

In the first pattern panel 321*a*, the light obstructing film B may be formed to correspond to the second hologram information S2 included in the second pattern panel 321*b*. Further, the first light transmitting film A1 may be a remaining region except the light obstructing film B, or a remaining region except the light obstructing film B and the first hologram information S1. Accordingly, the first partial light L1 may be configured to be transmitted through the entire region of the first hologram S1. Thus, while the first partial light L1 may be transmitted through the first hologram information S1 of the first pattern panel 321*a* and the light transmitting film A2 of the second pattern panel 321*b*, the transmission type hologram H1 may be formed.

Since the light obstructing film B is formed on the first pattern panel 321*a* corresponding to the position of the second hologram information S2, the first partial light L1 may be prevented from reaching the second hologram information S2. However, the second partial light L2 emitted from the direction different from the first partial light L1 may directly reach the second hologram information S2. Accordingly, the second partial light L2 may be reflected by the second hologram information S2, and the reflection type hologram H2 may be formed. In other words, the transmission type hologram H1 and the reflection type hologram H2 may be formed substantially simultaneously, and an observer may recognize the reflection type hologram H2 of the protruding form as compared to the transmission type hologram H1, based on a difference in implementation of the hologram.

Figure 25:
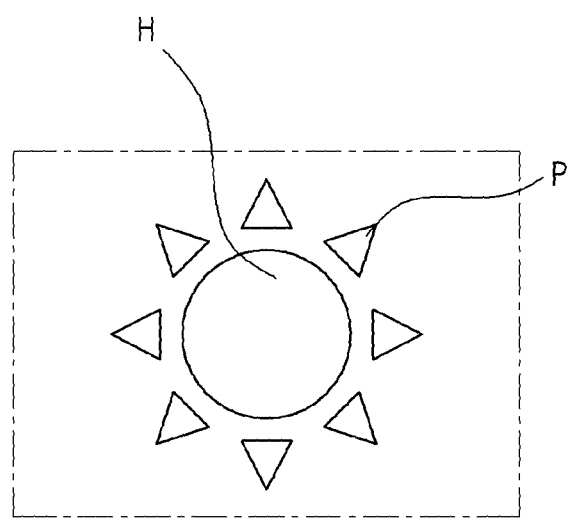
FIG. 25 is an exemplary diagram illustrating a first light pattern and a second light pattern according to another exemplary embodiment of the present disclosure.

Hereinafter, a case where the first light pattern and the second light pattern are made up of a combination of the information providing light pattern and the transmission type hologram. In particular, of the first light pattern and the second light pattern, the light pattern that provides a protruding image includes the information providing light pattern transmitted through the light transmitting film of a certain shape, and a light pattern which provides other images other than the protruding image includes the transmission type hologram. In particular, when the second light pattern provides the protruding image, and the first light pattern provides a non-protruding image, as illustrated in FIG. 25, a case where the first light pattern and the second light pattern are each of the transmission type hologram H and the information providing light pattern P will be explained. Here, the information providing light pattern P may be a light pattern transmitted through the light transmitting film of a certain shape.

The aforementioned light pattern forming unit 320 may include hologram storage medium 321. The hologram storage medium 321 may include the hologram information of the transmission type hologram H. Thus, by the light transmitted through the hologram storage medium 321, the transmission type hologram H may be formed.

Figure 26:
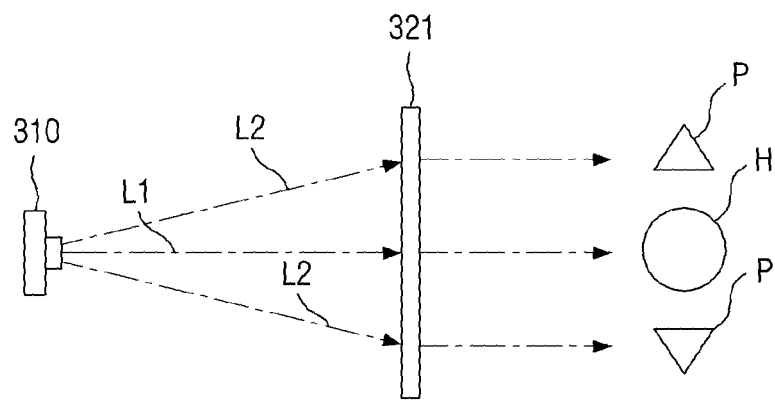
FIG. 26 is an exemplary diagram illustrating the light pattern formed by the automotive hologram image producing lamp according another exemplary embodiment of the present disclosure.
Figure 27:
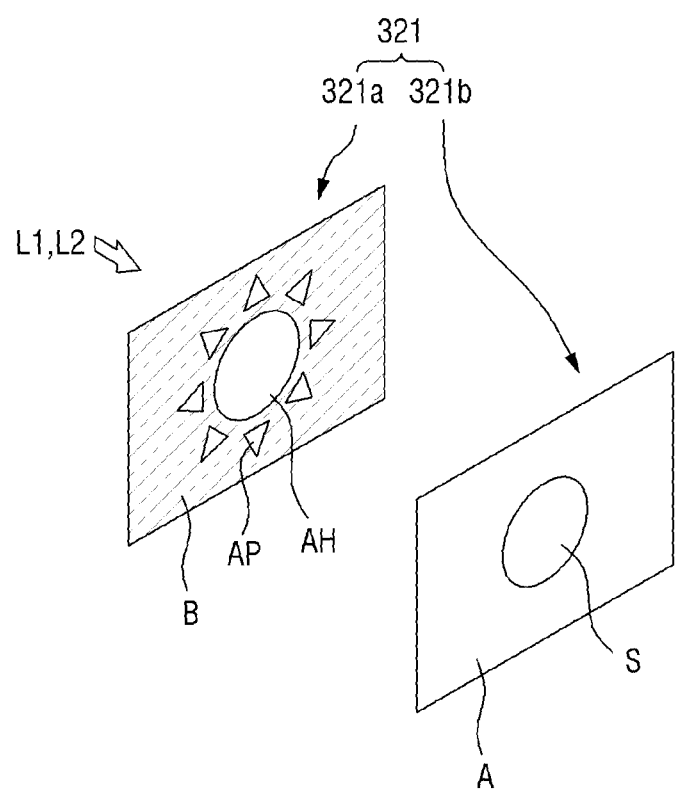
FIG. 27 is an exemplary diagram illustrating a hologram reproducing medium that forms the light pattern of FIG. 25.

As illustrated in FIG. 26, as the light source 310 emits the light, the transmission type hologram H and the information providing light pattern P may be formed. When the first partial light L1 and the second partial light L2 are transmitted through the hologram storage medium 321, the transmission type hologram H and the information providing light pattern P may be formed. FIG. 27 is an exemplary diagram illustrating a hologram reproducing medium that forms the light pattern of FIG. 25. The hologram storage medium 321 may include the first pattern panel 321a and the second pattern panel 321b that may overlap each other.

The first pattern panel 321a may include a light obstructing film B, a hologram light transmitting film AH and a pattern light transmitting film AP. The light obstructing film B may block the transmission of the first partial light L1 and the second partial light L2. The hologram light transmitting film AH may be configured to transmit the first partial light L1, and the pattern light transmitting film AP may transmit the second partial light L2. The second pattern panel 321b may include the hologram information S. In the first pattern panel 321a, the hologram light transmitting film AH may be formed to correspond to the form of a hologram information S included in the second pattern panel 321b. In the first pattern panel 321a, the pattern light transmitting film AP may be formed to correspond to the form of the information providing light pattern P. In the first pattern panel 321a, the light obstructing film B may be a remaining region except the hologram light transmitting film AH and the pattern light transmitting film AP.

While the first partial light L1 is transmitted through the hologram light transmitting film AP of the first pattern panel 321a and the hologram information S of the second pattern panel 321b, the transmission type hologram H may be formed. Further, while the second partial light L2 may be transmitted through the pattern light transmitting film AP of the first pattern panel 321a and the light transmitting film A of the second pattern panel 321b, the information providing light pattern P may be formed.

Although FIG. 27 illustrates the hologram storage medium 321 in which the light obstructing film B, the hologram light transmitting film AH, the pattern light transmitting film AP and the hologram information S are selectively included in the first pattern panel 321a and the second pattern panel 321b, the hologram storage medium 321 may be provided by only a single pattern panel (not illustrated). In particular, the light obstructing film B, the pattern light transmitting film AP and the hologram information S may be included in a single pattern panel. When the first partial light L1 is transmitted through the hologram information S, the transmission type hologram H may be formed, and when the second partial light L2 is transmitted through the pattern light transmitting film AP, the information providing light pattern P may be formed. In other words, the transmission type hologram H and the information providing light pattern P may be formed substantially simultaneously, and an observer may recognize the information providing light pattern P of the protruding type as compared to the transmission type hologram H, due to a difference in implementation between the hologram and the light pattern.

Figure 28:
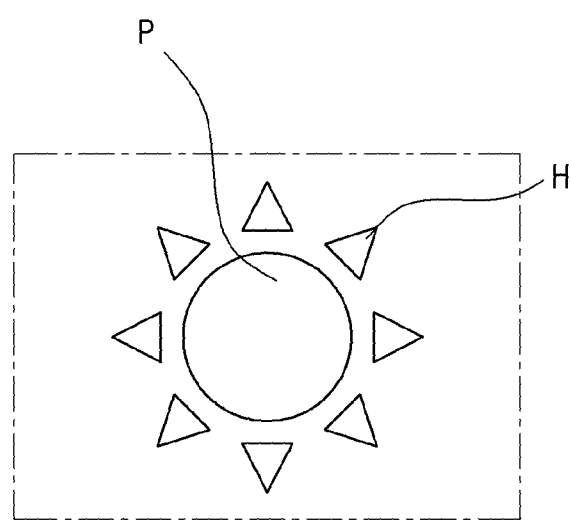
FIG. 28 is an exemplary diagram illustrating the first light pattern and the second light pattern according another exemplary embodiment of the present disclosure.

Hereinafter, the case where the first light pattern and the second light pattern may be made up of a combination of the reflection type hologram and the information providing light pattern. In particular, of the first light pattern and the second light pattern, the light pattern that provides a protruding image may include a reflection type hologram, and the light pattern that provide other images other than the protruding image includes the information providing light pattern transmitted through the light transmitting film of a certain shape. In particular, as a case where the second light pattern provides the protruding image and the first light pattern provides the non-protruding image, as illustrated in FIG. 28, a case where each of the first light pattern and the second light pattern may be each of the information providing light pattern P and the reflection type hologram H will be explained. For example, the information providing light pattern P may be a light pattern transmitted through the light transmitting film of a certain shape.

Figure 29:
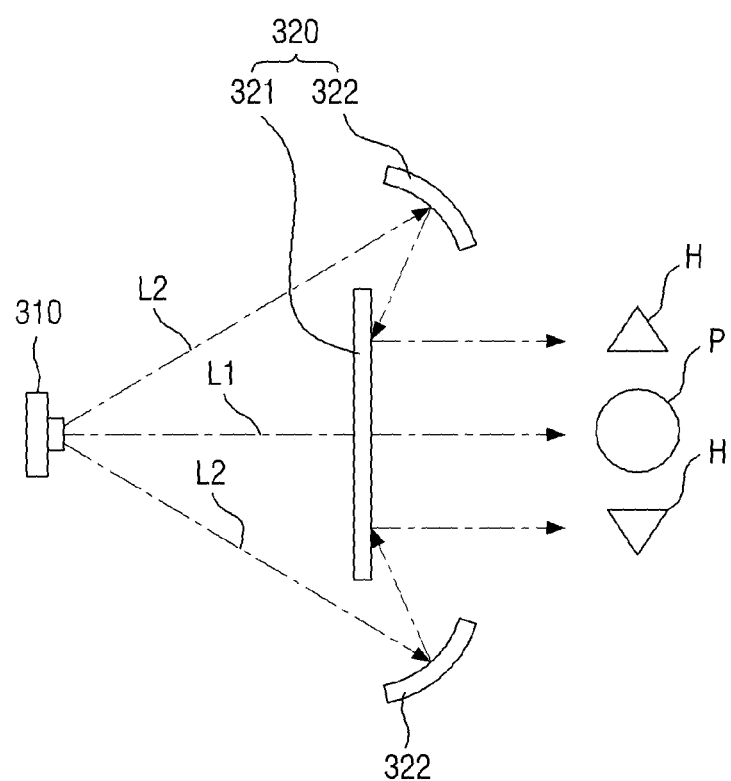
FIGS. 29 to 30 are exemplary diagrams illustrating the light pattern formed by the automotive hologram image producing lamp according another exemplary embodiment of the present disclosure.
Figure 30:
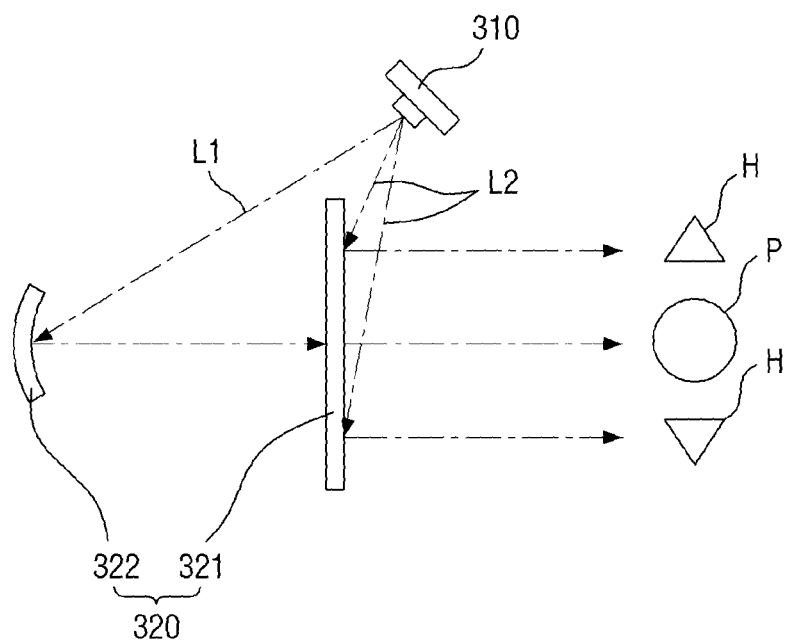

The aforementioned light pattern forming unit 320 may include hologram storage medium 321 and a reflector 322. The hologram storage medium 321 may include the hologram information of the light transmitting film corresponding to the shape of the information providing light pattern P and the reflection type hologram H. Thus, when the light may be transmitted through the hologram storage medium 321 or may be reflected by the hologram storage medium 321, the information providing light pattern P and the reflection type hologram H may be formed. The reflector 322 may be configured to reflect the first partial light L1 or the second partial light L2 and guide the first and second partial lights to the hologram storage medium 321. FIGS. 29 and 30 illustrate an automotive hologram image producing lamp 10 that forms the light pattern associated therewith.

As illustrated in FIG. 29, as the light source 310 emits the light, the information providing light pattern P and the reflection type hologram H may be formed. When the first partial light L1 may be transmitted through the hologram storage medium 321, the information providing light pattern P may be formed, and as the second partial light L2 is reflected by the hologram storage medium 321, the reflection type hologram H may be formed. To implement the information providing light pattern P and the reflection type hologram H at the same time, the light pattern forming unit 320 may include a reflector 322. Since the direct light emitted from a single light source 310 may not be transferred to both sides of the hologram storage medium 321, the reflector 322 may be provided.

Although FIG. 29 illustrates a configuration in which the first partial light L1 is a direct light and the second partial light L2 is a reflected light, as illustrated in FIG. 30, the first partial light L1 may be a reflected light and the second partial light L2 may be a direct light. In particular, the first partial light L1 reflected by the reflector 322 may be transmitted through the hologram storage medium 321 to form the information providing light pattern P, and the second partial light L2 as the direct light is reflected by the hologram storage medium 321 to form the reflection type hologram H. Furthermore, the information providing light pattern P and the reflection type hologram Ha may not be correctly formed only by a single light source 310. Thus, an auxiliary light source may be provided. Since the auxiliary light source has been described above, a detailed description thereof will not be provided.

Figure 31:
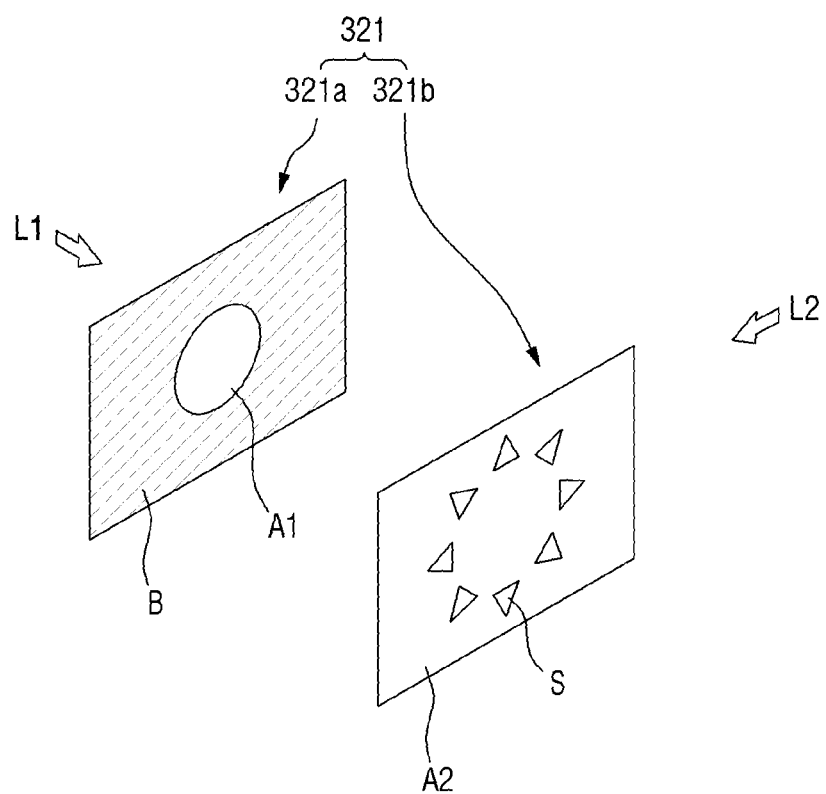
FIG. 31 is an exemplary diagram illustrating a hologram reproducing medium that forms the light pattern of FIG. 28.

FIG. 31 is an exemplary diagram illustrating a hologram reproducing medium that forms the light pattern of FIG. 28. The hologram storage medium 321 may include the first pattern panel 321a and the second pattern panel 321b that overlap each other. FIG. 31 illustrates a configuration in which the light obstructing film pattern B and the first light transmitting film A1 are included on the first panel 321a, and the hologram information S and the second light transmitting film A2 are included on the second pattern panel 321b. The first partial light L1 emitted to the first pattern panel 321a may be obstructed by the light obstructing film B and may be transmitted through the first light transmitting film A1. In the first pattern panel 321a, the first light transmitting film A1 may be formed to correspond to the form of the information providing light pattern P. Thus, while the first partial light L1 may be transmitted through the first light transmitting film A1 of the first pattern panel 321a and the second light transmitting film A2 of the second pattern panel 321b, the information providing light pattern may be formed.

When the light obstructing film B is formed on the first pattern panel 321a corresponding to the position of the hologram information S, the first partial light L1 may not reach the second hologram information S2. However, the second partial light L2 emitted from the direction different from the first partial light L1 may not directly reach the hologram information S. Thus, the second partial light L2 may be reflected by the hologram information S, and the reflection type hologram H may be formed. In particular, the reflecting means such as a reflection film may be provided on one side of the light obstructing film B that faces the hologram information S. When the hologram information S may be a transparent or semitransparent material, the reflection efficiency of the second partial light L2 on the surface of the hologram information S may be further improved.

In other words, the information providing light pattern P and the reflection type hologram H may be formed at sustainably the same time, and an observer may recognize the reflection type hologram H of the protruding type as compared to the information providing light pattern P, due to a difference in implementation between the hologram and the light pattern. While the hologram storage medium 321 including the first pattern panel 321a and the second pattern panel 321b has been described through FIGS. 22 to 24, 27 and 31, this is an example, and it is also possible to provide further various hologram storage medium. In particular, by various combinations of the light obstructing film, the light transmitting film and the hologram information, the first pattern panel 321a and the second pattern panel 321b may be provided. Or, it is also possible to provide the hologram storage medium that includes a single pattern panel or three or more pattern panels.

While the present disclosure has been particularly illustrated and described with reference to exemplary embodiments thereof, it will be understood by those of ordinary skill in the art that various changes in form and detail may be made therein without departing from the spirit and scope of the present disclosure as defined by the following claims.

The exemplary embodiments should be considered in a descriptive sense only and not for purposes of limitation.

The invention claimed is:

1. An automotive hologram image producing lamp, comprising:
a light source configured to emit light;
a light deforming unit configured to convert the emitted light into a beam that has a wavelength and a phase substantially similar to a wavelength and a phase of a reference beam used to record a hologram;
a hologram forming unit configured to receive incidence of the beam converted by the light deforming unit, wherein the beam is transmitted through the hologram forming unit, a partial beam among the transmitted beam reproduces the hologram, and a remaining beam among the transmitted beam subsequently proceeds to a light pattern forming unit,
wherein the light pattern forming unit is configured to receive the remaining beam from the hologram forming unit to form an information providing light pattern.

2. The automotive hologram image producing lamp of claim 1, wherein the hologram forming unit includes a hologram storage medium on which hologram information is recorded, and selectively includes a reflector configured to reflect the partial beam and guide the partial beam to the hologram storage medium.

3. The automotive hologram image producing lamp of claim 2, wherein the hologram storage medium records interference fringes generated by interference between the reference beam and an object beam as the hologram information.

4. The automotive hologram image producing lamp of claim 3, wherein a wavelength and a phase of the emitted light are identical to the wavelength and the phase of the reference beam, respectively.

5. The automotive hologram image producing lamp of claim 1, wherein the light pattern forming unit includes a light guide.

6. The automotive hologram image producing lamp of claim 1, wherein the light source, the hologram forming unit and the light pattern forming unit are disposed within a tail lamp or a turn signal lamp of the vehicle.

7. The automotive hologram image producing lamp of claim 1, wherein the light pattern forming unit displays at least one selected from the group consisting of a tail lamp, a brake lamp, a turn signal lamp, and a reversing lamp.

* * * * *